(12) United States Patent
Bien

(10) Patent No.: US 6,311,077 B1
(45) Date of Patent: Oct. 30, 2001

(54) COMBINED COSMETICS COMPACT AND CELLULAR RADIOTELEPHONE

(75) Inventor: Jonathan S. Bien, Edgewater, NJ (US)

(73) Assignee: M3 Advisory Services, Inc., Edgewater, NJ (US)

( * ) Notice: Subject to any disclaimer, the term of this patent is extended or adjusted under 35 U.S.C. 154(b) by 0 days.

(21) Appl. No.: 09/349,651

(22) Filed: Jul. 8, 1999

(51) Int. Cl.$^7$ ................ H04B 1/38; H04B 1/06; H04B 1/08; H04M 1/00; H05K 11/00
(52) U.S. Cl. ............ 455/566; 455/344; 455/347; 455/90
(58) Field of Search .............. 455/556, 90, 344, 455/550, 566; 206/581, 235; 132/314, 315, 316; 359/265, 267, 275, 322, 320, 589, 340, 468

(56) References Cited

U.S. PATENT DOCUMENTS

| | | | |
|---|---|---|---|
| D. 112,272 | * | 9/1938 | Kotler . |
| D. 119,284 | * | 1/1940 | Rosenberg . |
| D. 146,619 | * | 4/1947 | Rabinowitch . |
| D. 351,049 | * | 9/1994 | Schlueter . |
| D. 370,681 | * | 6/1996 | Diamond . |
| D. 371,127 | * | 6/1996 | Baab . |
| D. 395,303 | * | 6/1998 | Kawashima . |
| D. 399,605 | * | 10/1998 | Metcalf . |
| D. 405,555 | * | 2/1999 | De Melo et al. . |
| D. 406,586 | * | 3/1999 | Nagele et al. . |
| D. 407,063 | * | 3/1999 | Reis, Jr. et al. . |
| D. 408,008 | * | 4/1999 | Richards et al. . |
| D. 408,030 | * | 4/1999 | Richards et al. . |
| D. 408,402 | * | 4/1999 | Shimelfarb et al. . |
| 5,329,947 | * | 7/1994 | Shikler ................ 132/304 |
| 5,566,224 | * | 10/1996 | Ul Azam et al. ............ 455/566 |
| 5,631,638 | * | 5/1997 | Kaspar et al. .............. 340/902 |
| 5,775,344 | * | 7/1998 | Clay ...................... 132/218 |
| 5,808,711 | * | 9/1998 | Suppelsa et al. ............. 349/74 |
| 5,825,527 | * | 10/1998 | Forgette et al. . |
| 5,890,052 | * | 3/1999 | Read et al. ................ 455/90 |

OTHER PUBLICATIONS

"Nokia Shoots for the Stars With New Phones".*

* cited by examiner

Primary Examiner—Nay Maung
Assistant Examiner—Ray Persino
(74) Attorney, Agent, or Firm—Arthur L. Plevy, Esq.; Duane, Morris & Heckscher

(57) ABSTRACT

A combined cosmetics compact and cellular radiotelephone device having a casing which includes the working components of a radiotelephone and a mirror. One of the working components of the radiotelephone is a display. The display operates in a first mode as the mirror. The display can include an apparatus for projecting information associated with the operation of the radiotelephone on the mirror when the display is operated in a second mode. The casing can include a first housing member and second housing member. The housing members and the working components of the radiotelephone form a cellular flip-radiotelephone. At least one receptacle for storing cosmetics can be provided in the casing. The battery of the device can be used for selectively operative for heating the receptacle. A cosmetics applicator can also be provided in the casing.

10 Claims, 2 Drawing Sheets

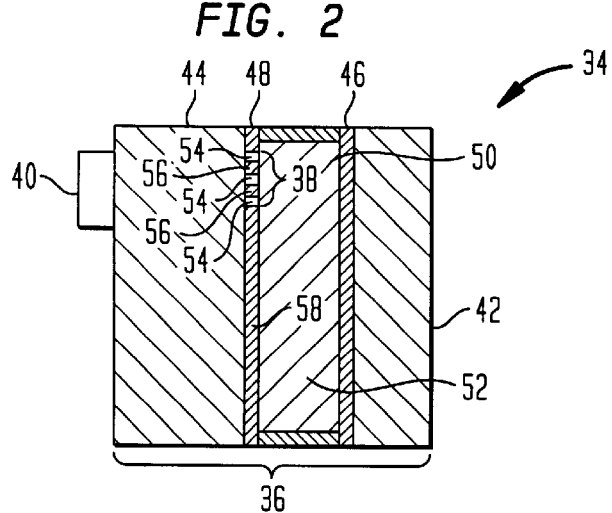
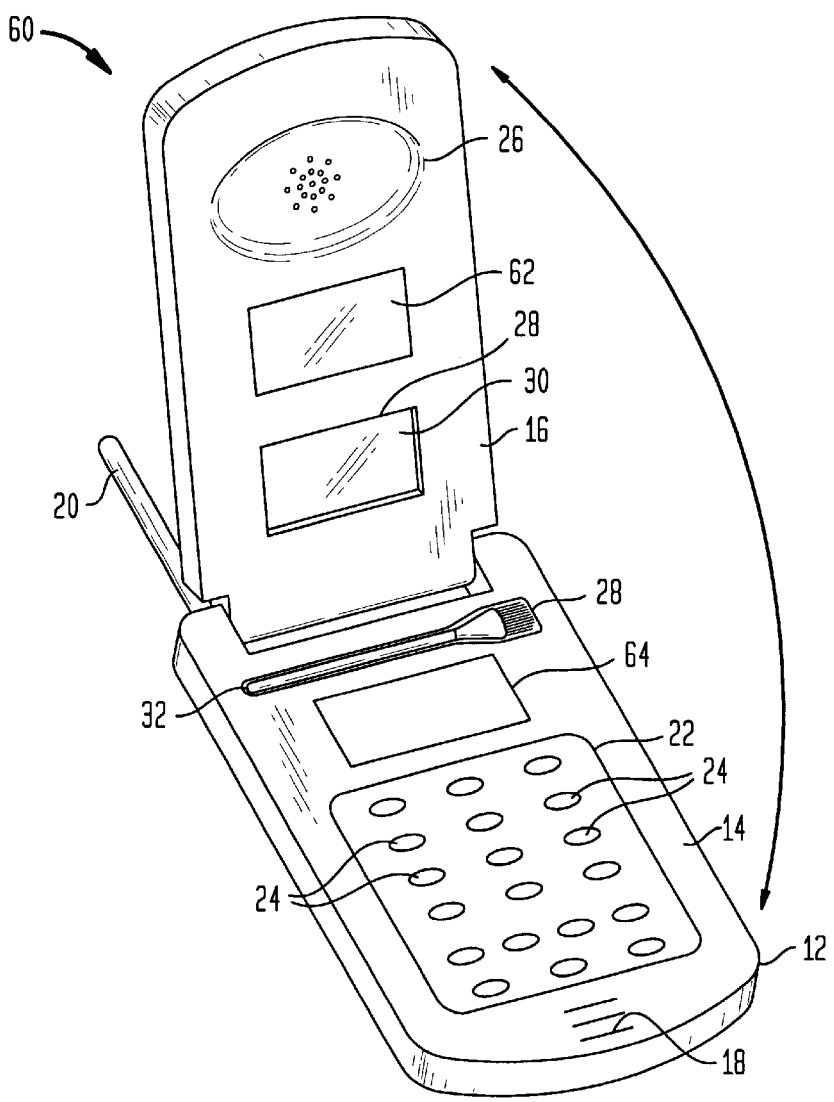

COMBINED COSMETICS COMPACT AND CELLULAR RADIOTELEPHONE

FIELD OF THE INVENTION

This invention relates to a cosmetics compact and a cellular radiotelephone and in particular, to a combined cosmetics compact and cellular radiotelephone.

BACKGROUND OF THE INVENTION

A cellular radiotelephone allows a user to place or receive a telephone call in any area covered by a cellular communications system. This ability to communicate from virtually any location has made cellular radiotelephones extremely popular. Cellular radiotelephone popularity has been further driven by design and technical advancements which permit to cellular radiotelephones to be conveniently carried.

One common cellular radiotelephone design utilizes two housing elements connected with a hinging mechanism. This arrangement provides a more compact cellular radiotelephone when the two housings are folded upon themselves.

Many radiotelephones utilizing the two-housing folding design have most of the electronics within a larger one of the two housings. The smaller housing or "flip" element, typically contains the microphone or speaker. Other cellular radiotelephones utilizing the folding two housing design have all the working components within the larger of the two housings. The flip element contains no electronics.

Many women carry cellular radiotelephones in handbags or jacket pockets. Although, cellular radiotelephones are relatively small and convenient to carry, space in handbags and pockets is limited and commonly used for carrying other items such as cosmetic makeup compacts.

Therefore, a need exists for a cellular telephone and cosmetic makeup compact which occupy less space and are more conveniently carried.

SUMMARY OF THE INVENTION

A combined cosmetics compact and cellular radiotelephone device comprising a casing which includes the working components of a radiotelephone and a mirror.

One of the working components of the radiotelephone comprises a display. The display operates in a first mode as the mirror.

The display can include means for projecting information associated with the operation of the radiotelephone on the mirror when the display is operated in a second mode.

The casing can include a first housing member and second housing member. The housing members and the working components of the radiotelephone form a cellular flip-radiotelephone.

At least one receptacle for storing cosmetics can be provided in the casing. The battery of the device can be used for selectively operative for heating the receptacle.

A cosmetics applicator can also be provided in the casing.

BRIEF DESCRIPTION OF THE DRAWINGS

The advantages, nature and various additional features of the invention will become more apparent upon consideration of the illustrative embodiments to be described in detail in connection with accompanying drawings wherein:

FIG. 2 is a sectional side view of a display screen which can be used in the device shown in FIG. 1; and FIG. 3 is a perspective view of a combined cosmetics compact and cellular radiotelephone device according to a second embodiment of the invention.

Figure 1:
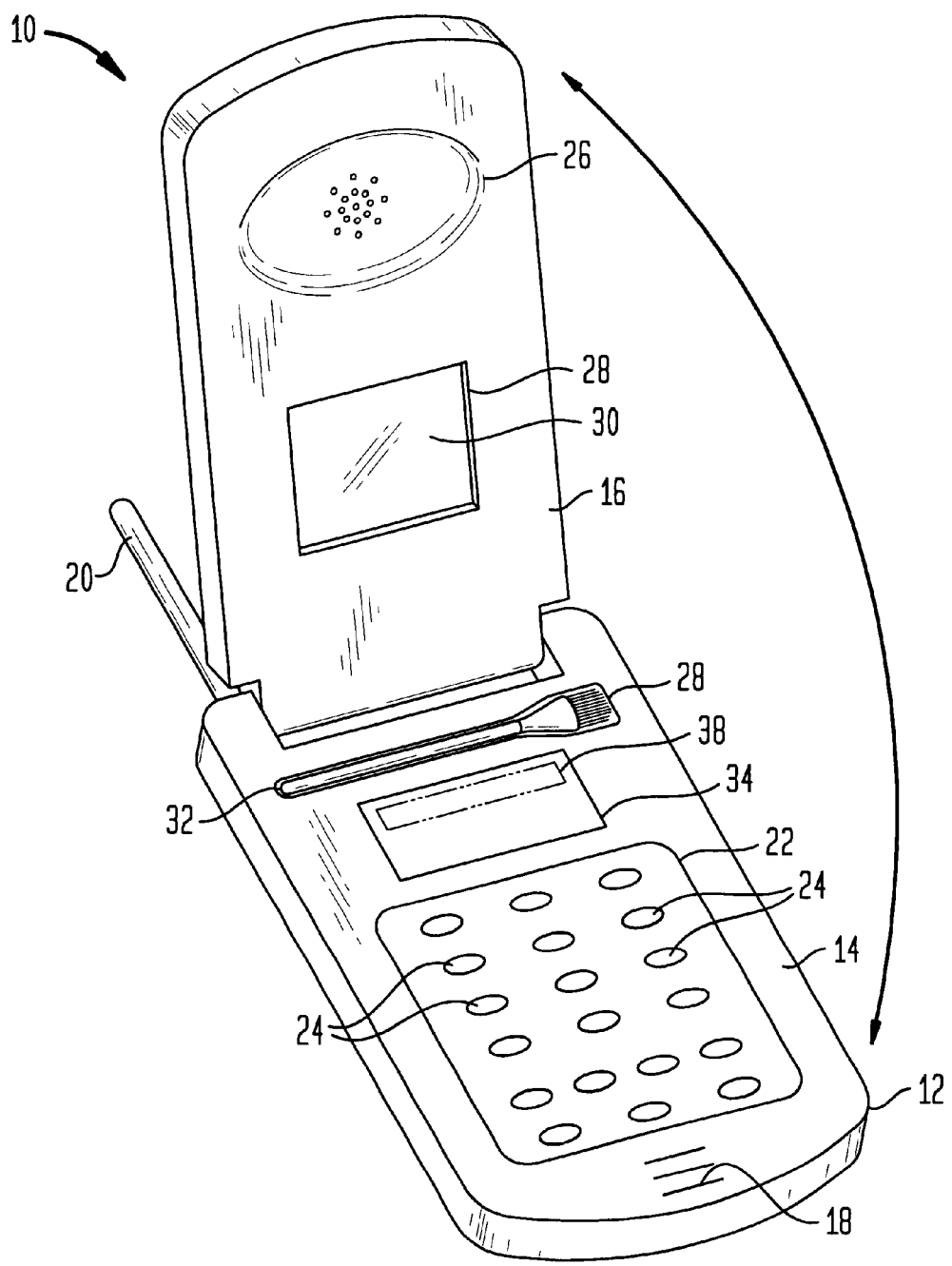
FIG. 1 is a perspective view of a combined cosmetics compact and cellular radiotelephone device according to an embodiment of the invention.

It should be understood that these drawings are for illustrating the concepts of the invention and are not to scale.

DETAILED DESCRIPTION OF THE INVENTION

FIG. 1 shows a portable, combined cosmetics package and cellular radiotelephone device 10 according to an embodiment of the invention. The device 10 comprises a casing 12 having a main housing 14 and a secondary housing 16 or flip element hinged to the main housing 14. The housings 14, 16 of the casing 12 are shown in an "open" position. The housings 14, 16 contain all the necessary electronic and mechanical components of a conventional cellular radiotelephone, the details of which are well known to those skilled in the cellular radiotelephone art and therefore, need not be described herein. Most of these components are typically contained in the main housing 14, although component location in the housings 14, 16 is a matter of design choice. In other embodiments of the invention, the housings 14, 16 of the casing 12 can be more conventionally constructed as a single, non-folding unit.

The working cellular radiotelephone components can include a microphone 18 for speaking, an antenna 20 which enables wireless communication between the device 10 and a base station (not shown), a rechargeable battery (not shown) that supplies power for the electronic components of the device 10, and a keypad 22 having a plurality of buttons 24 in a conventional telephone arrangement for dialing phone numbers. The keypad 22 can also have additional function buttons such as channel select, volume control, and other buttons associated with telephone operation. A speaker 26 for listening is typically provided in the flip element 16. One or more receptacles 28 for storing various cosmetics 30 (such as lip gloss, powder, etc.) and conventional cosmetic applicators 32 (such as brushes or pads) are defined in the main housing 18 and/or flip element 16. In some embodiments the receptacles 28 used for storing make-up type cosmetics can be heated via power supplied by the battery of the device 10 to heat the make-up type, thus making it easier to apply. The cosmetic receptacles 28 can also include a conventional closure arrangement for preventing spillage.

The main housing 14 of the device further includes a display screen 34 which operates in a display mode to display alphanumeric characters that provide typical information relating to cellular operation of the device such as inputted or outputted telephone numbers and signal or battery strength, and in a mirror mode as a vanity mirror.

As shown in FIG. 2, the display screen 34 can be implemented using an electrochromic mirror 36 that has an information display area 38 (broken lines in FIG. 1) which displays alphanumeric characters produced by a display device 40 aligned with the information display area of the electrochromic mirror 36. The structural and operational details of such a display screen can be found in U.S. Pat. No. 5,825,527 entitled "INFORMATION DISPLAY AREA ON ELECTROCHROMIC MIRRORS HAVING THIRD SURFACE METAL REFLECTOR" issued Oct. 20, 1998, the disclosure of which is incorporated herein by reference.

As shown in FIG. 2, the electrochromic mirror 36 of the display screen 34 typically includes spaced apart outer and inner glass elements 42, 44. The outer element 42 is transparent and includes a layer 46 of transparent conductive material disposed on its rear surface. The inner element 44 includes at least one layer 48 of a reflective conductive material disposed on its front surface. The outer and inner elements 42, 44 are sealably bonded together in a spaced-apart relationship so that they define a chamber 50 therebetween. An electrochromic reversibly variable transmittance medium 52 is contained in the chamber 50 in contact with the conductive layers 46, 48 of transparent and reflective material. The information display area 38 is defined on the front surface of the inner element and is visible through the outer element 42. The display area is made up of lines 54 devoid of conductive reflective material separated by lines 56 of the conductive reflective material. The lines 56 of conductive reflective material are in electrical contact with the remaining portion 58 of conductive reflective material 48. The display 40 is juxtaposed with the rear surface of the inner element 44 and aligned with the information display area 38. The display 40 is conventional and can include liquid crystal displays, light-emitting diode displays or any other suitable display that is capable of displaying alphanumeric characters.

The device 10 can be operated as cellular radiotelephone or a cosmetic compact by merely switching the display screen 34 between the display mode and the mirror mode using one of the keypad buttons 24. The button 24 actuates electronic circuitry disposed in one or both of housings 14, 16 that applies an appropriate voltage to the transparent and reflective conductive layers 46, 48 of the electrochromic mirror 36. The applied voltages increase or decrease the transmittance of the electrochromic transmittance medium 52 contained in the chamber 50 of the mirror 36 thereby increasing or decreasing the mirror's reflectivity. It should be noted that when the device 10 is in the mirror mode it can also be used as a security device to allow a user to discreetly view activity taking place behind them.

When the display screen 34 is switched in the display mode, the reflectivity of the electrochromic mirror 36 is selectively reduced to permit viewing of information presented by the display 40 through the outer element 42 of the mirror 36. This feature permits the device 10 to be conventionally operated as a cellular radiotelephone.

Switching the display screen 34 into the mirror mode selectively increases the reflectivity of the electrochromic mirror 36 thus, permitting a user to view their image in the display screen 34. This feature and the included cosmetics 30 and cosmetic applicator 32 allow the device 10 to be advantageously used as a cosmetics compact. If an incoming telephone call is received while the display screen 34 is switched in the mirror mode, the electronic circuitry associated with the display screen 34 can be adapted to automatically switch the display screen 34 to the display mode to allow the device to be operated as a cellular radiotelephone again.

FIG. 3 shows a portable, combined cosmetics package and cellular radiotelephone device 60 according to a second embodiment of the invention where the like reference numerals identify like elements. The device 60 of this embodiment differs from the device 10 of FIGS. 1 and 2 in that it includes a conventional mirror 62 integrated into the flip element 16. Alternatively, the mirror 62 could be integrated into the main housing 14 if desired. In any case, the mirror 62 integrated into one of the housings 14, 16 permits a conventional display screen and display arrangement 64 to be used.

While the foregoing invention has been described with reference to the above embodiment, various modifications and changes can be made without departing from the spirit of the invention. Accordingly, all such modifications and changes are considered to be within the scope of the appended claims.

What is claimed is:

1. A cosmetics package comprising:
    a case having a first housing member and a second housing member, the housing members hinged to each other to permit pivotal movement between an open position and a closed position;
    at least one receptacle for storing cosmetics, the at least one receptacle associated with one of the first and second housing members; and
    working components of a cellular radiotelephone disposed in at least one of the first and second housing members, wherein one of the working components of the cellular radiotelephone is an electrochromic mirror that is switchable between a display mode and a mirror mode, the mirror switched in the display mode having a reduced reflectivity which permits a user to view cellular radiotelephone operational information across the entire surface of the mirror, the mirror switched in the mirror mode having increased reflectivity which permits the user to view reflected images across the entire surface of the mirror.

2. The cosmetics package according to claim 1, wherein another one of the components of the cellular radiotelephone is a battery, the battery being selectively operative for heating the at least one receptacle.

3. The cosmetics package according to claim 1, wherein the at least one receptacle is associated with the first housing member and the mirror is associated with the second housing member.

4. The cosmetics package according to claim 1, wherein the at least one receptacle and the mirror are associated with the same one of the first and second housing members.

5. The cosmetics package according to claim 1, further comprising a cosmetics applicator associated with one of the first and second housing members.

6. A portable cellular radiotelephone comprising:
    a casing;
    working components of a cellular radiotelephone disposed within the casing; and
    an electrochromic mirror disposed in the casing, the electrochromic mirror being switchable between a display mode and a mirror mode, the mirror switched in the display mode having a reduced reflectivity which permits a user to view cellular radiotelephone operational information across the entire surface of the mirror, the mirror switched in the mirror mode having increased reflectivity which permits the user to view reflected images across the entire surface of the mirror.

7. The radiotelephone according to claim 6, wherein the casing includes a first housing member and second housing member, the housing members and the working components of the cellular telephone forming a cellular flip-radiotelephone.

8. The radiotelephone according to claim 6, further comprising at least one receptacle for storing cosmetics, the at least one receptacle disposed in the casing.

9. The radiotelephone according to claim 8, wherein one of the components of the cellular radiotelephone is a battery, the battery being selectively operative for heating the at least one receptacle.

10. The radiotelephone according to claim 6, further comprising a cosmetics applicator associated with the casing.

* * * * *